(12) United States Patent
Hou et al.

(10) Patent No.: US 11,590,451 B2
(45) Date of Patent: Feb. 28, 2023

(54) WATER STORAGE DEVICE AND EXHAUST GAS TREATMENT SYSTEM

(71) Applicant: CHANGXIN MEMORY TECHNOLOGIES, INC., Anhui (CN)

(72) Inventors: Xiaomingxing Hou, Hefei (CN); Yi-Ming Lin, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 30 days.

(21) Appl. No.: 17/467,627

(22) Filed: Sep. 7, 2021

(65) Prior Publication Data

US 2022/0023797 A1   Jan. 27, 2022

Related U.S. Application Data

(63) Continuation of application No. PCT/CN2021/104478, filed on Jul. 5, 2021.

(30) Foreign Application Priority Data

Jul. 27, 2020  (CN) .......................... 202010730709.2

(51) Int. Cl.
*B01D 47/02* (2006.01)
*B01D 53/78* (2006.01)
*F01N 3/04* (2006.01)

(52) U.S. Cl.
CPC ........... *B01D 53/78* (2013.01); *B01D 47/022* (2013.01); *F01N 3/04* (2013.01)

(58) Field of Classification Search
CPC ...... B01D 53/78; B01D 47/022; B01D 47/00; B01D 53/14; B01D 53/38; B01D 53/40; B01D 2221/14; B01D 2251/00; B01D 2252/103; B01D 2258/0216; B01D 2259/124; F01N 3/04; B65D 5/40

See application file for complete search history.

(56) References Cited

U.S. PATENT DOCUMENTS 2,149,748 A  *  3/1939  Oswald ................. C02F 1/5236
                                                    127/71

FOREIGN PATENT DOCUMENTS

| CN | 204269195 U | | 4/2015 | | |
| CN | 105784073 A | | 7/2016 | | |
| CN | 108 163 911 A | * | 6/2018 | ............. | B01D 53/14 |
| CN | 207 546 180 U | * | 6/2018 | ............. | B01D 53/74 |
| CN | 109297568 A | | 2/2019 | | |

(Continued)

*Primary Examiner* — Timothy C Vanoy
(74) *Attorney, Agent, or Firm* — Cooper Legal Group, LLC (57) ABSTRACT

The water storage device includes: a water storage cavity and a water inlet, the water inlet being configured to feed a solution into the water storage cavity, the water storage cavity being configured to store or discharge the solution and containing a viscous substance; a guide rod and a floating device movable along the guide rod, the floating device being movable as a water level in the water storage cavity changes, and the viscous substance between the guide rod and the floating device restraining movement of the floating device; and a water curtain casing, the water curtain casing being connected to the water inlet and configured to split a part of the solution from the solution fed from the water inlet, and the solution split by the water curtain casing being configured to flush the viscous substance between the guide rod and the floating device.

15 Claims, 9 Drawing Sheets

(56) References Cited

FOREIGN PATENT DOCUMENTS

| | | | | | |
|---|---|---|---|---|---|
| CN | 208688621 | U | | 4/2019 | |
| CN | 110 508 435 | A | * | 11/2019 | ........... B05B 14/465 |
| CN | 210 521 980 | U | * | 5/2020 | ............. B01D 35/05 |
| CN | 210774267 | U | | 6/2020 | |
| CN | 211659655 | U | | 10/2020 | |
| CN | 212779497 | U | | 3/2021 | |
| CN | 216 149 113 | U | * | 4/2022 | |
| CN | 216 533 108 | U | * | 5/2022 | |
| JP | H07215175 | A | | 8/1995 | |
| JP | 2018 051 534 | A | * | 4/2018 | ............. B01D 53/78 |

\* cited by examiner

FIG. 9

WATER STORAGE DEVICE AND EXHAUST GAS TREATMENT SYSTEM

CROSS-REFERENCE TO RELATED APPLICATIONS

This is a continuation application of International Patent Application No. PCT/CN2021/104478, filed on Jul. 5, 2021, which claims priority to Chinese Patent Application No. 202010730709.2, filed on Jul. 27, 2020, and entitled "WATER STORAGE DEVICE AND EXHAUST GAS TREATMENT SYSTEM". The disclosures of International Patent Application No. PCT/CN2021/104478 and Chinese Patent Application No. 202010730709.2 are incorporated by reference herein in their entireties.

TECHNICAL FIELD

The embodiments of the present disclosure relate to the field of exhaust gas treatment, in particular to a water storage device and an exhaust gas treatment system.

BACKGROUND

There is a multi-step ALD-NIT process in a semiconductor furnace tube technology, and this type of process will generate a large amount of gas by-products. At present, such gas by-products are usually treated by burning and cooling to form solid by-products which are stored in an exhaust gas treatment system and are flushed with an aqueous solution. The aqueous solution for flushing the processing by-products is fed into a water storage device for recycling after being treated. When the number of cycles reaches to a certain target, this type of aqueous solution will be directly discharged to the factory end and exhausted through special treatment. The water storage device in the exhaust gas treatment system will be replenished with a new aqueous solution.

Due to insufficient combustion and insufficient treatment, the aqueous solution fed into the water storage device usually contains some residual processing by-products. This part of the processing by-products may affect the normal operation of the water storage device, thereby causing the failure of water circulation and even downtime of the entire exhaust gas treatment system.

SUMMARY

The embodiments of the present disclosure provide a water storage device and an exhaust gas treatment system.

An embodiment of the present disclosure provides a water storage device. The water storage device includes: a water storage cavity and a water inlet, in which the water inlet is configured to feed a solution into the water storage cavity, the water storage cavity is configured to store or discharge the solution, and the water storage cavity contains a viscous substance; a guide rod and a floating device movable along the guide rod, in which the floating device is movable as the a water level in the water storage cavity changes, and the viscous substance between the guide rod and the floating device restrains movement of the floating device; and a water curtain casing, in which the water curtain casing is communicated with the water inlet, the water curtain casing is configured to split a part of the solution from the solution fed from the water inlet, and the solution split by the water curtain casing is configured to flush the viscous substance between the guide rod and the floating device.

Correspondingly, an embodiment of the present disclosure further provides an exhaust gas treatment system. The exhaust gas treatment system includes: at least one water storage device described above, and an exhaust gas reaction chamber. The exhaust gas reaction chamber is connected to the water storage device, the water storage device is configured to store a solution for flushing a processing by-product in the exhaust gas reaction chamber, and the solution is recyclable.

BRIEF DESCRIPTION OF THE DRAWINGS

One or more embodiments are exemplarily explained through the figures in accompanying drawings corresponding thereto, these exemplary explanations do not constitute a limitation to the embodiments, elements having same reference numerals in the accompanying drawings are denoted as similar elements; and unless otherwise specifically declared, the figures in the accompanying drawings do not constitute a limitation of proportion.

DETAILED DESCRIPTION

In order to make the objectives, technical solutions and advantages of the embodiments of the present disclosure more apparent, hereinafter, the respective embodiments of the present disclosure will be described in detail in connection with the accompanying drawings. However, those ordinary skilled in the art may understand that, in the respective embodiments of the present disclosure, numerous technical details are set forth in order to provide a reader with a better understanding of the present disclosure. However, the technical solutions claimed in the present disclosure can also be implemented without these technical details and various changes and modifications based on the respective embodiments below.

Figure 1:
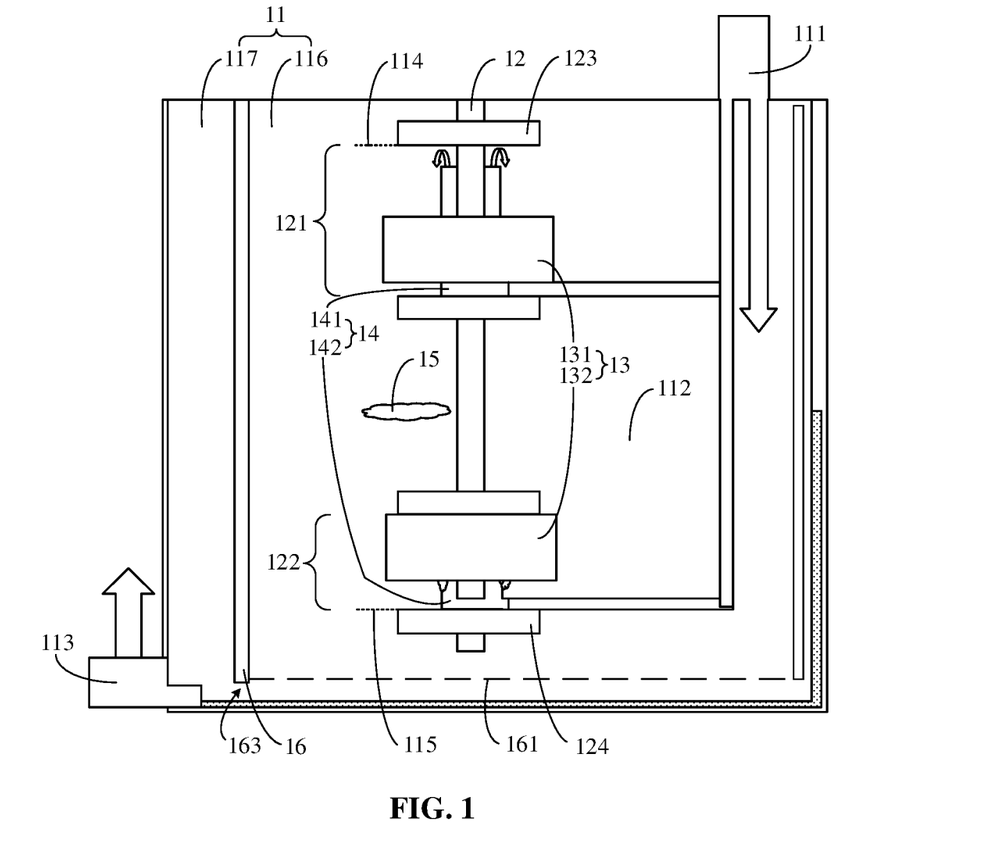
FIG. 1 to FIG. 6 are schematic diagrams of a water storage device.

Referring to FIG. 1, a water storage device includes: a water storage cavity 11 and a water inlet 111, in which the water inlet 111 is configured to feed a solution 112 into the water storage cavity 11, the water storage cavity 11 is configured to store or discharge the solution 112, and the water storage cavity 11 contains a viscous substance 15; a guide rod 12 and a floating device 13 movable along the guide rod 12, in which the floating device 13 is movable as a water level in the water storage cavity 11 changes, and the viscous substance 15 between the guide rod 12 and the floating device 13 may restrain the movement of the floating device 13; and a water curtain casing 14, in which the water curtain casing 14 is communicated with the water inlet 111, the water curtain casing 14 is configured to split a part of the solution 112 from the solution fed from the water inlet 111, and the solution 112 split by the water curtain casing 14 is configured to flush the viscous substance 15 between the guide rod 12 and the floating device 13.

In this embodiment, the water storage cavity 11 includes a water outlet 113, and a first chamber 116 and a second chamber 117 communicated with each other. The guide rod 12 is arranged in the first chamber 116. The water outlet 113 is communicated with the second chamber 117. The water inlet 111 is configured to feed the solution 112 for flushing a processing by-product in an exhaust gas reaction chamber into the first chamber 116, and the water outlet 113 is configured to discharge the solution 112. The first chamber 116 and the second chamber 117 are isolated from each other by an isolation plate 16 and a filter screen 161. The filter screen 161 is configured to filter the viscous substance 15.

The solution 112 fed from the water inlet 111 may be a recycled solution after flushing the processing by-product, or may be a replenished solution. If the solution is a recycled solution, before being fed into the water storage device, the solution has already flushed the processing by-product in the exhaust gas reaction chamber. However, due to insufficient combustion and insufficient treatment, the recycled solution usually contains the viscous substance 15. The viscous substance 15 will always remain in the first chamber 116 due to the obstruction of the filter screen 161. Therefore, before regular maintenance is performed on the water storage device, the viscous substance 15 will always remain in the first chamber 116, and the viscous substance 15 may move in the solution 112 as the solution 112 is fed.

It should be noted that the solution 112 fed from the water inlet 111 may be municipal water, or a cleaning solution diluted with water, or a cleaning solution that does not contain water. In other words, the names of the water inlet 111, the water storage cavity 11 and the water storage device are just to declare that the solution 112 has a flow characteristic similar to that of water, which does not mean that the solution 112 is water.

In an embodiment, the second chamber 117 may also include other water inlets, so as to further increase the water storage speed. The solution 112 fed into the second chamber 117 through other water inlets may be municipal water that does not contain the viscous substance 15, thereby avoiding the viscous substance 15 from affecting the flushing effect of the solution 112.

In this embodiment, the water storage cavity 11 includes a communication port 163 for communicating the first chamber 116 with the second chamber 117. The communication port 163 is arranged at a bottom portion of the water storage cavity 11. In a direction perpendicular to a bottom surface of the water storage cavity 11, a thickness of the communication port 163 is comprised between 20 mm and 40 mm, such as 25 mm, 30 mm and 35 mm Since most of the viscous substances are relatively light and easy to float on the solution 112, the communication port 163 is arranged at the bottom portion of the water storage cavity 11, so that it is beneficial to preventing the unfiltered viscous substance 15 from reaching to the second chamber 117 through the communication port 163 and being discharged.

In this embodiment, the water storage device includes a first region 121 and a second region 122. The water curtain casing 14 includes a first casing 141 and a second casing 142. The solution 112 split by the first casing 141 is configured to flush the viscous substance 15 between the guide rod 12 and the floating device 13 in the first region 121, and the solution split by the second casing 142 is configured to flush the viscous substance 15 between the guide rod 12 and the floating device 13 in the second region 122. With the arrangement of a plurality of water curtain casings 14, the region needed to be flushed by each water curtain casing 14 can be reduced, which ensures that each water curtain casing 14 can effectively clean the designated smaller region, thereby ensuring that the floating device 13 can effectively move as the water level changes.

Figure 2:
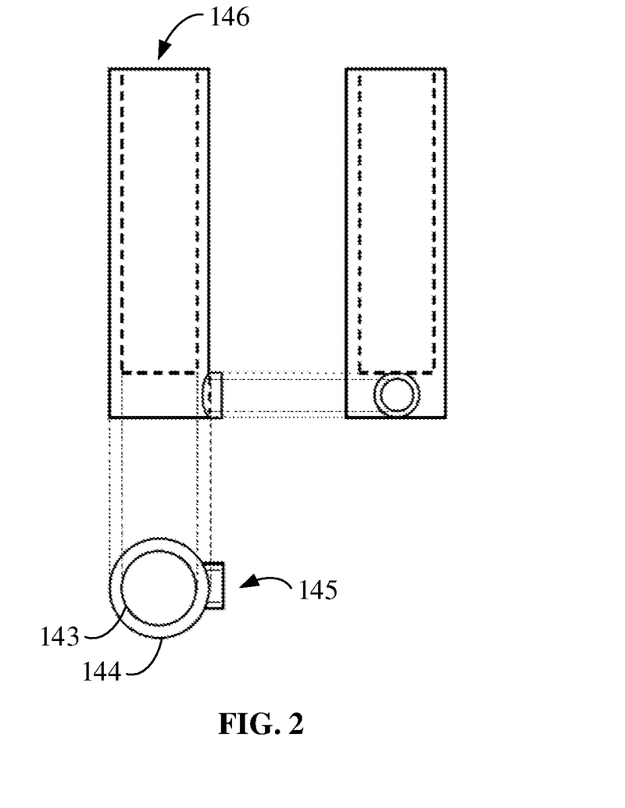

In this embodiment, referring to FIG. 2, the water curtain casing 14 includes a fixed casing 143 and a surrounding casing 144. The fixed casing 143 is configured to be fixed on the guide rod 12 (referring to FIG. 1), and the surrounding casing 144 surrounds the fixed casing 143. A first gap is formed between the fixed casing 143 and the surrounding casing 144, and the solution 112 flows out through the first gap and flushes the viscous substance 15 adhered to the water curtain casing 14. The guide rod 12 is fixed in the fixed casing 143, and the water curtain casing 14 is detachable relative to the guide rod 12.

Figure 3:
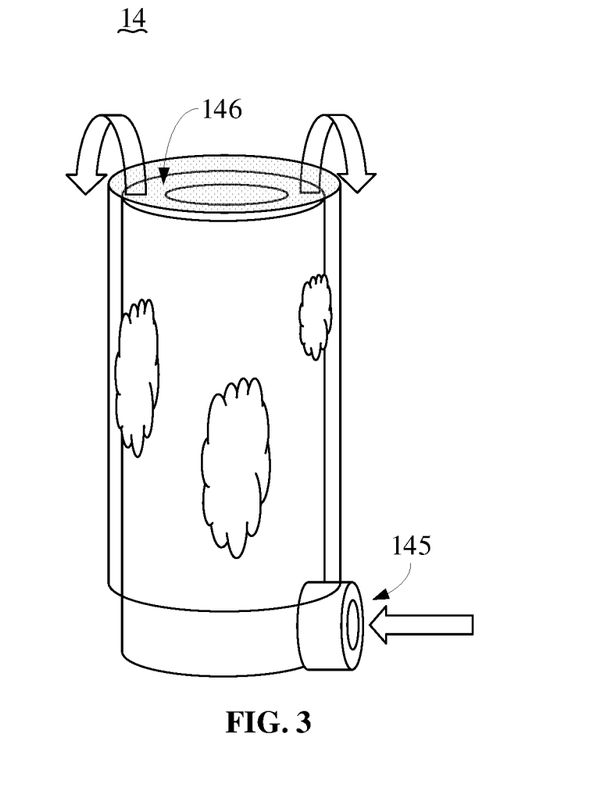
Figure 4:
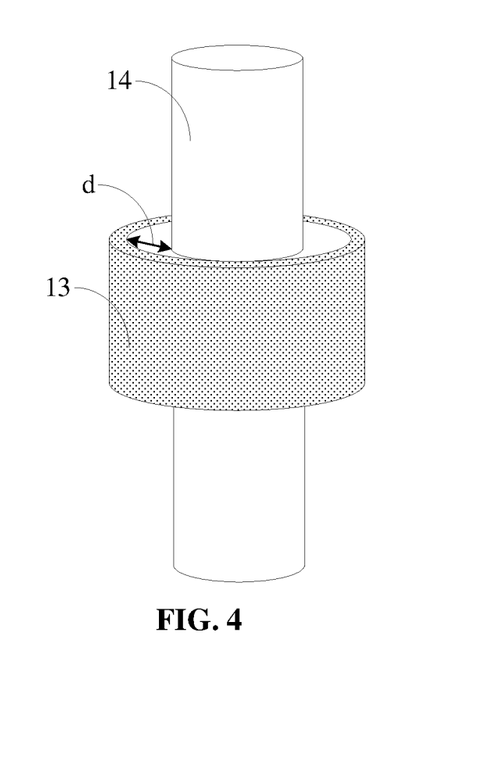

Referring to FIG. 3 and FIG. 4, the water curtain casing 14 includes an inlet end 145 and an outlet end 146. The outlet end 146 is arranged above the inlet end 145. The solution 112 injected into the water curtain casing 14 flows upward and flows out of the outlet end 146, and the solution 112 flowing out of the water curtain casing 14 flows in the direction of gravity. It should be noted that when the structure as shown in FIG. 3 is configured for flushing, the fixed casing 143 should be deeper to accommodate the guide rod 12 as much as possible, so that the viscous substance 15 is adhered to the surface of the side wall of the water curtain casing 14 which can be flushed.

In other embodiments, the outlet end is arranged below the inlet end. The orientation of the outlet end is the same as the direction of gravity. The solution injected into the water curtain casing flows downward (that is, along the direction of gravity) out of the outlet end, and further flushes the viscous substance between the guide rod and the floating device. When such a structure is configured for flushing, the depth of the fixed casing should be as shallow as possible (in other words, the water curtain casing should be as short as possible), so that the viscous substance can be adhered to the side wall of the guide rod which can be flushed.

In this embodiment, the width of the first gap in a direction perpendicular to the side wall of the water curtain casing 14 ranges from 2 mm to 4 mm, such as 2.5 mm, 3 mm or 3.5 mm. If the first gap is too small, under the condition that the flow rate of the solution 112 split by the water curtain casing 14 is constant, the solution 112 may be sprayed directly at a higher rate instead of flowing out along the side wall of the water curtain casing 14, so that the viscous substance 15 adhered to the side wall of the water curtain casing 14 cannot be effectively flushed. If the first gap is too large, the radius of the surrounding casing 144 is too large, and the area of the side wall of the water curtain casing 14 is relatively large, so that more viscous substances 15 may be adhered to the side wall of the water curtain casing 14, thereby causing greater obstacles to the movement of the floating device 13.

In this embodiment, since there is no requirement for tight connection between the water curtain casing 14 and the guide rod 12, and in order to facilitate the removal of the water curtain casing 14 to maintain the water storage device, the clearance fit between the water curtain casing 14 and the guide rod 12 may be set to be a larger gap, such as D8/h8.

In this embodiment, the water curtain casing 14 is arranged between the guide rod 12 and the floating device 13, and the floating device 13 moves along the water curtain casing 14. When the water level in the water storage cavity 11 rises, the side wall of the water curtain casing 14 is in contact with the solution 112, and the viscous substance 15 mixed in the solution 112 is adhered to the side wall of the water curtain casing 14. When the water level in the water storage cavity 11 falls, the solution 112 discharged from the water curtain casing 14 flows along the side wall of the water curtain casing, so as to flush the viscous substance 15 on the side wall of the water curtain casing 14, so that the floating device 13 can move downward as the water level falls. It should be noted that in this embodiment, since the solution 112 flows by gravity to flush the viscous substance 15, there is a low requirement for the flow rate at the water inlet 111.

When the flow rate at the water inlet 111 is relatively small, the flushing purpose can also be realized. In other embodiments, the solution with a large flow rate may also be configured for flushing the side wall of the water curtain casing to flush the viscous substance, thereby realizing a better flushing effect.

In this embodiment, the weight of the floating device 13 ranges from 20 g to 30 g, such as 22 g, 25 g or 28 g. Since the flushing ability of the solution 112, which only relies on the gravity to flow, is relatively weak, when there are more viscous substances 15 adhered to the side wall of the water curtain casing 14, the solution 112 flowing out of the water curtain casing 14 cannot completely remove the viscous substances 15 on the side wall of the water curtain casing. In order to avoid the remaining viscous substance 15 from affecting the downward movement of the floating device 13, the weight of the floating device 13 should be increased, so as to overcome certain of resistance of the viscous substance 15 by gravity. Meanwhile, in order to avoid excessive displacement required for floating the floating device 13, the weight of the floating device 13 should be limited.

The weight of the floating device 13 is related to the drainage rate of the water outlet 113. When the drainage rate of the water outlet 113 is higher, the falling rate of the water level in the water storage cavity 11 is also higher, and the lowering rate of the floating device 13 after overcoming the adhesion force under the action of gravity should also be higher, that is, the weight of the floating device 13 should be larger.

In this embodiment, the cross-sectional area of the floating device 13 in a direction perpendicular to an extension direction of the guide rod 12 is comprised between 900 mm$^2$ and 1000 mm$^2$, such as 920 mm$^2$, 950 mm$^2$ or 980 mm$^2$. Since the viscous substance 15 will be adhered to the side wall of the water curtain casing 14 in contact with the solution 112, when the water level in the water storage cavity 11 falls and then rises again, the side wall of the water curtain casing is subjected to the adhesion force from the viscous substance 15. Thus, the cross-sectional area of the floating device 13 is set within the above range, so that it is beneficial to ensuring that the floating device 13 has a larger buoyancy when floating upward, so as to overcome the adhesion force of the viscous substance 15 to realize the synchronous rise with the water level, thereby effectively reflecting the change of the water level. Meanwhile, in order to prevent the volume of the floating device 13 from being too large, the cross-sectional area should be limited.

The floating device 13 may be of a structure with various shapes, such as a circular ring, a cuboid and the like.

In this embodiment, referring to FIG. 4, a second gap d is formed between the floating device 13 and the water curtain casing 14 in a direction perpendicular to the side wall of the water curtain casing 14. The width of the second gap d ranges from 0.5 mm to 1.5 mm, such as 0.8 mm, 1 mm or 1.2 mm. If the second gap d is too small, the viscous substance 15 adhered to the water curtain casing 14 will more easily restrain the movement of the floating device 13. If the second gap d is too large, the solution 112 split by the water curtain casing 14 will not easily flow onto the side wall of the water curtain casing 14 to flush the viscous substance 15.

It should be noted that the solution 112 in the water storage cavity 11 is not stationary. As the solution 112 flows, the floating device 13 also sloshes. The sloshed floating device 13 may impact and damage the water curtain casing 14 and the guide rod 12. The impact caused by the floating device 13 is related to the sloshing rate of the floating device 13, and the sloshing rate is related to the acceleration distance. The wider the second gap d between the floating device 13 and the water curtain casing 14 is, the longer the acceleration distance of the floating device 13 is. Under the push of the flowing solution 112, the floating device 13 may impact the water curtain casing 14 at a larger rate, so that the water curtain casing 14 cannot normally feed water or even the overall structure collapses.

In addition, the maximum value of the second gap d is related to the feeding rate and the drainage rate. The higher each of the feeding rate and the drainage rate is, the more easily the floating device 13 sloshes. Thus, the maximum value of the second gap d should be smaller.

Figure 5:
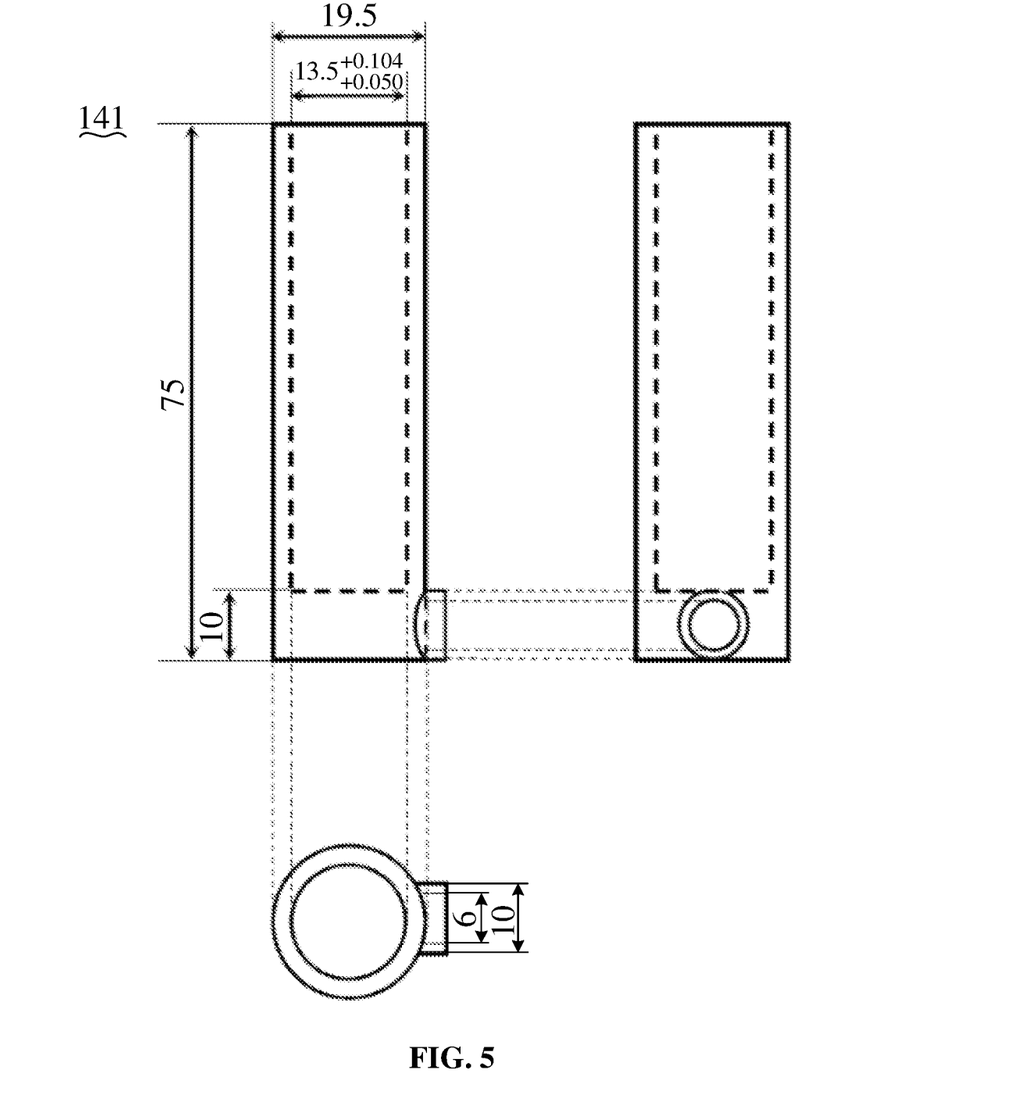
Figure 6:
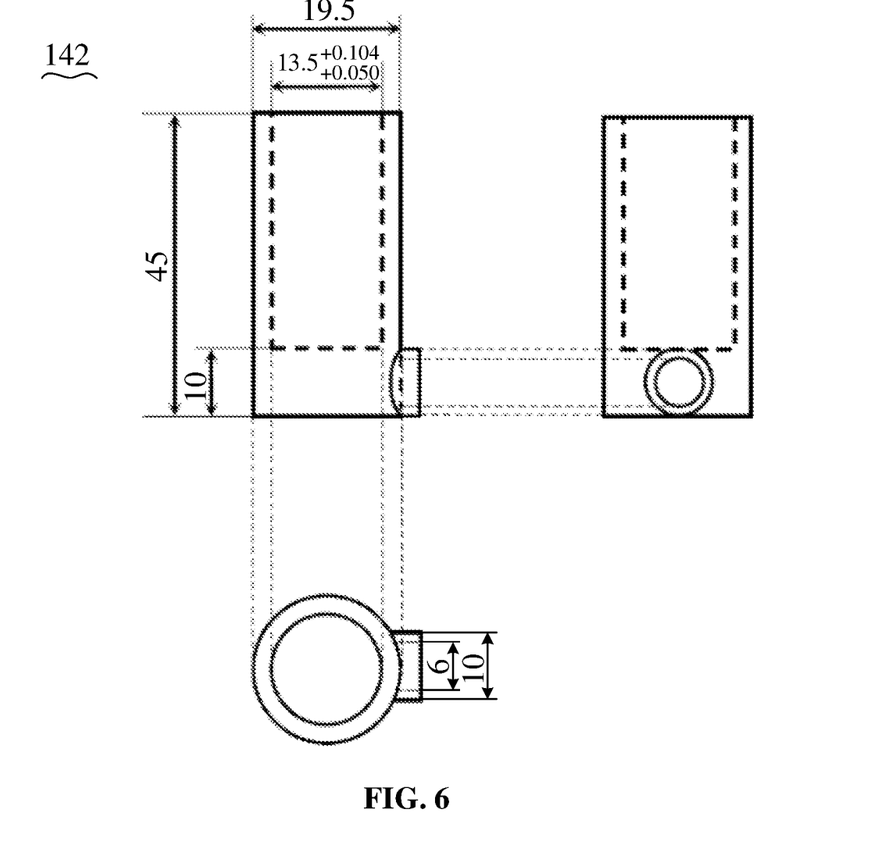

Referring to FIG. 2, FIG. 5 and FIG. 6, the radius ψ of the fixed casing 143 in the water curtain casing 14 is $13.5_{+0.050}^{+0.104}$ mm. The distance between the bottom surface of the fixed casing 143 and the bottom surface of the water curtain casing 14 is 10 mm. The outer diameter of the water curtain casing 14 is 19.5 mm. The inner diameter of the water inlet of the water curtain casing 14 is 6 mm, and the outer diameter of the water inlet is 10 mm. The height of the first casing 141 is 75 mm, and the height of the second casing 142 is 45 mm.

In this embodiment, the water storage cavity 11 includes a low water level line 115 and a high water level line 114. The first region 121 includes the high water level line 114, and the second region 122 includes the low water level line 115. The floating device 13 includes a first floating device 131 and a second floating device 132. The first floating device 131 moves in the first region 121, and the second floating device 132 moves in the second region 122. The arrangement of a plurality of floating devices 13 arranged in different regions is beneficial to ensuring that when the falling rate or rising rate of the water level is greater than the moving rate of the floating device 13, the time difference between the floating device 13 and the solution reaching to the same level is shorter. In other words, the height difference between the floating device 13 and the level of the solution at any time is smaller. The position of the floating device 13 can effectively reflect the condition of the water level.

In this embodiment, the water storage device further includes a warning component (not shown). The warning component is configured to send out warning information when the floating device 13 is at the low water level line 115 or the high water level line 114.

Exemplarily, the guide rod 12 includes a first baffle 123 and a second baffle 124 for limiting the movement of the floating device 13. A first sensor is arranged in the first baffle 123, and a second sensor is arranged in the second baffle 124. When the first sensor detects that the first floating device 131 is in contact with the first baffle 123, or the first floating device 131 reaches to a preset position, it is considered that the level of the solution 112 reaches to the high water level line 114, so that a high water level alarm is sent out. When the second sensor detects that the second floating device 132 is in contact with the second baffle 124, or the second floating device 132 reaches to a preset position, it is considered that the level of the solution 112 is at the low water level line 115, so that a low water level alarm is sent out.

Hereinafter, the operating principle of the water storage device will be described in detail through the change of the water level.

Figure 7:
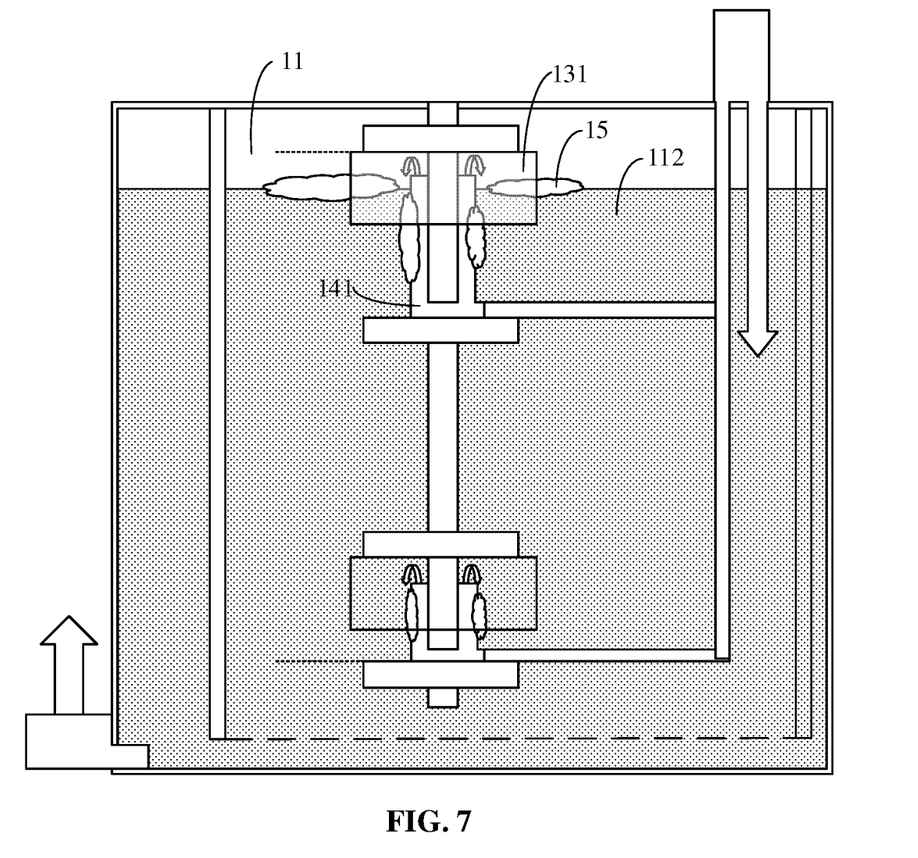
FIG. 7 to FIG. 9 are schematic diagrams corresponding to various stages in an operation process of a water storage device.

Referring to FIG. 7, when the water level in the water storage cavity 11 rises and the solution 112 is in contact with the surface of the side wall of the first casing 141, the viscous substance 15 mixed in the solution 112 will be adhered to the side wall of the first casing 141. In this case, the solution 112 split by the first casing 141 directly flows into the accumulated solution 112, so that the viscous substance 15 adhered to the side wall of the first casing 141 cannot be flushed.

Figure 8:
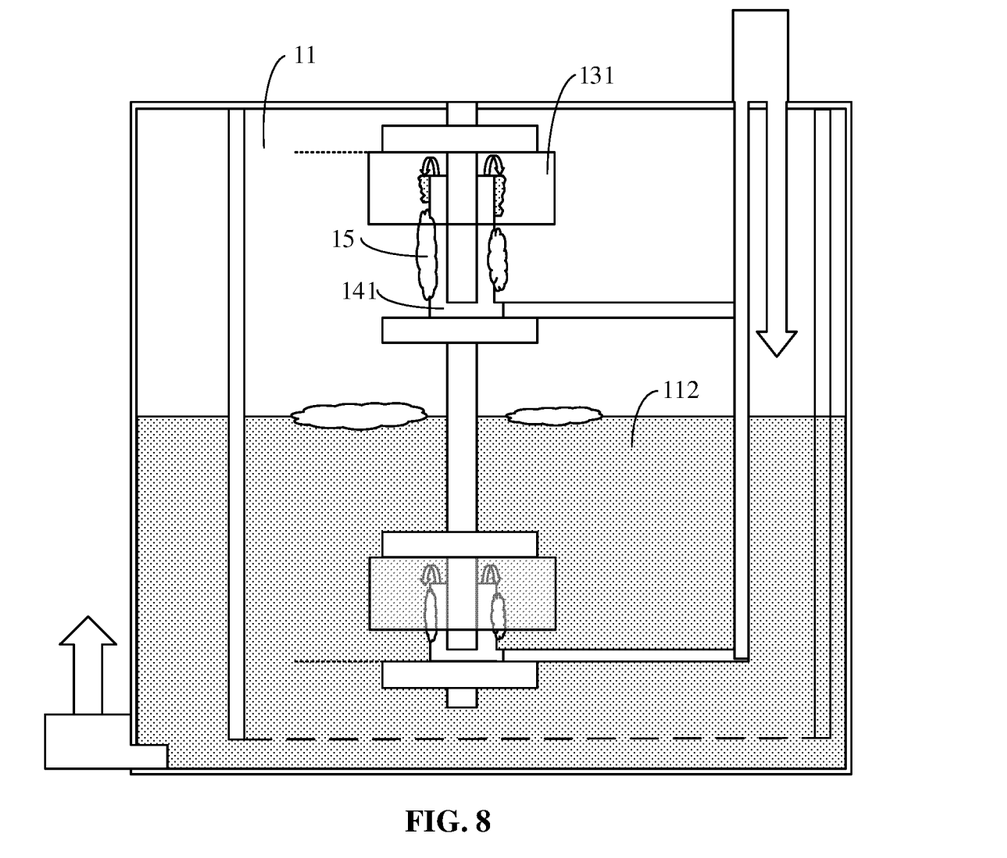

Referring to FIG. 8, when the water level in the water storage cavity 11 falls, the solution 112 discharged from the first casing 141 is in contact with and flushes the viscous substance 15 adhered to the side wall of the first casing 141 through the gap between the first casing 141 and the first floating device 131 under the action of gravity. The flushing of the solution 112 can reduce the amount of viscous substances to reduce the adhesion force, so that the first floating device 131 can move downward by overcoming the adhesion force by virtue of its weight. In this way, it is beneficial to preventing the first sensor from falsely reporting the high water level warning information.

Figure 9:
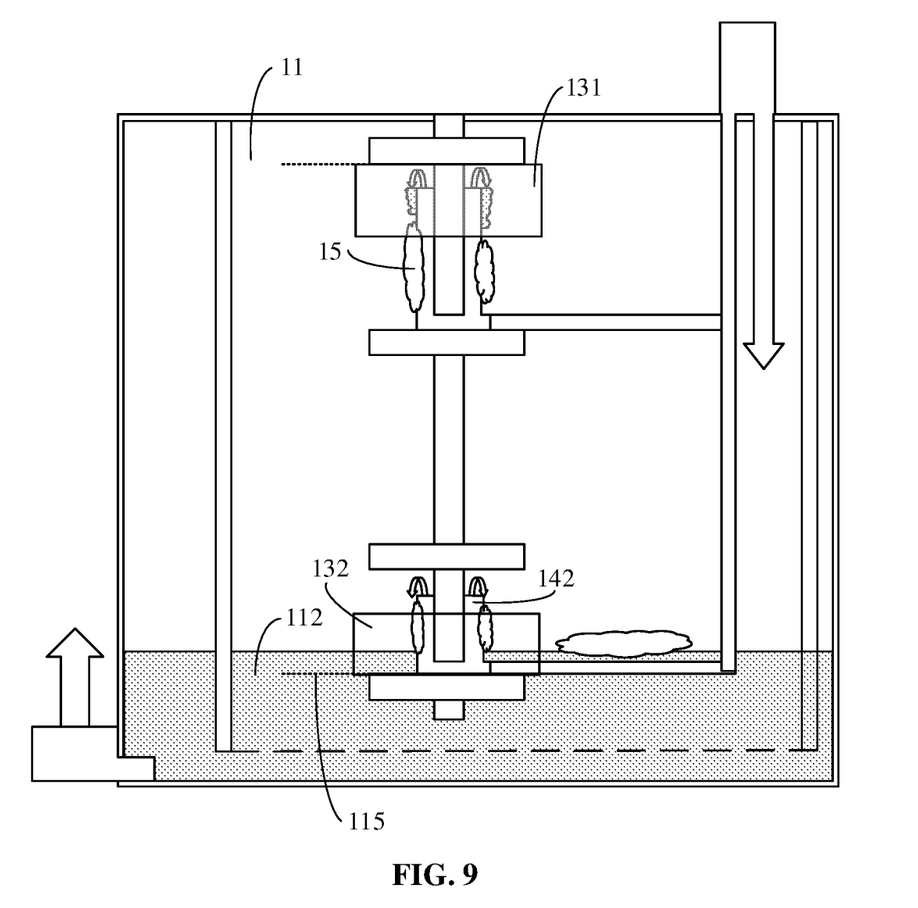

Referring to FIG. 9, when the water level falls to the low water level line 115, low water level warning information is triggered. In this case, the solution split by the second casing 142 flushes the viscous substance 15 adhered to the side wall of the second casing 142, so as to ensure that when the water level rises again, the second floating device 132 can rise with the water level, thereby preventing the second sensor from falsely reporting low water level warning information.

In this embodiment, the water curtain casing is communicated with the water inlet to achieve a splitting effect. The solution fed from the water inlet is not only configured for storage, but also configured for flushing the viscous substance between the guide rod and the floating device through the water curtain casing. There is no need to use an additional water source to flush the viscous substance, so that it is beneficial to reducing the water demand of the water storage device, while ensuring that the movement of the floating device is not restrained by the viscous substance.

Correspondingly, an embodiment of the present disclosure further provides an exhaust gas treatment system. The exhaust gas treatment system includes at least one water storage device described above, and an exhaust gas reaction chamber. The exhaust gas reaction chamber is communicated with the water storage device, the water storage device is configured to store a solution for flushing a processing by-product in the exhaust gas reaction chamber, and the solution is recyclable.

The above-mentioned water storage device is configured to form the exhaust gas treatment system, so that it is beneficial to reducing the risk of downtime of the exhaust gas treatment system due to the failure of the water storage device, thereby reducing the risk of product scrapping.

In this embodiment, the exhaust gas treatment system includes at least two exhaust gas reaction chambers. Each exhaust gas reaction chamber is communicated with a water storage device. The exhaust gas reaction chamber can use the solution in the water storage device to flush the processing by-product in the exhaust gas reaction chamber. The exhaust gas treatment system further includes a control device configured to control at least one of the exhaust gas reaction chambers to perform the exhaust gas treatment. Since the operation of a plurality of exhaust gas reaction chambers adopts a feedback processing mechanism, when any water storage device fails and causes downtime of the exhaust gas reaction chamber communicated therewith, the control device can switch to another exhaust gas reaction chamber to perform the exhaust gas treatment. In this way, it is beneficial to further reducing the probability of downtime of the exhaust gas treatment system, thereby reducing the risk of product scrapping, and reducing the risk loss.

Taking the exhaust gas treatment system including two exhaust gas reaction chambers as an example, the specific risk loss is estimated as follows.

The existing mainframe equipment is mostly vertical furnace tubes. When fully loaded, a tube has an average of 100 pieces of wafers. Assuming that the cost of each piece of wafers is 400 dollars, then the cost of the wafers per tube is: $W=100\times 400=40000$ dollars. Before the above-mentioned water storage device is used, the cost of the risk loss caused by the failure of the water storage device is: $Q1=W\times \xi 12=40000\times \xi 12$. After the above-mentioned water storage device is used, the cost of the risk loss caused by the failure of the water storage device is: $Q2=W\times \xi 22=40000\times \xi 22$. According to the experience, $\xi 1$ is about 0.08, and $\xi 2$ is about 0. Thus, the risk loss that can be reduced by adjusting the exhaust gas treatment system is $Q=256$ dollars/100 pieces. If the monthly production capacity is 40K pieces, the monthly risk loss that can be reduced is about 102,400 dollars (about RMB 726,000 yuan).

The present disclosure provides an exhaust gas treatment system, so that it is beneficial to reducing the water demand and the risk of downtime of the exhaust gas treatment system, thereby reducing the risk of product scrapping.

Those of ordinary skill in the art may understand that the above embodiments are specific embodiments to implement the present disclosure. In practical applications, various changes can be made in forms and details without departing from the spirit and scope of the present disclosure. Any person skilled in the art may make changes and modifications without departing from the spirit and scope of the present disclosure. Therefore, the scope of protection of the present disclosure should be subject to the scope defined by the appended claims.

The invention claimed is:

1. A water storage device, comprising:
a water storage cavity and a water inlet, wherein the water inlet is configured to feed a solution into the water storage cavity, the water storage cavity is configured to store or discharge the solution, and the water storage cavity contains a viscous substance;
a guide rod and a floating device movable along the guide rod, wherein the floating device is movable as a water level in the water storage cavity changes, and the viscous substance between the guide rod and the floating device restrains movement of the floating device; and
a water curtain casing, wherein the water curtain casing is communicated with the water inlet, the water curtain casing is configured to split a part of the solution from the solution fed from the water inlet, and the solution split by the water curtain casing is configured to flush the viscous substance between the guide rod and the floating device.

2. The water storage device of claim 1, wherein the water storage device further comprises a first region and a second region, the water curtain casing comprises a first casing and a second casing, the solution split by the first casing is configured to flush the viscous substance between the guide rod and the floating device in the first region, and the solution split by the second casing is configured to flush the viscous substance between the guide rod and the floating device in the second region.

3. The water storage device of claim 2, wherein the water storage cavity has a low water level line and a high water level line, the first region comprises the high water level line, the second region comprises the low water level line, the floating device comprises a first floating device and a second floating device, the first floating device moves in the first region, and the second floating device moves in the second region.

4. The water storage device of claim 3, wherein the water storage device further comprises a warning component configured to send out warning information when the floating device is at the low water level line or the high water level line.

5. The water storage device of claim 1, wherein the solution flowing out of the water curtain casing flows along a direction of gravity.

6. The water storage device of claim 5, wherein the water curtain casing comprises an inlet end and an outlet end, and the outlet end is arranged above the inlet end.

7. The water storage device of claim 1, wherein the water curtain casing is arranged between the guide rod and the floating device, the floating device moves along the water curtain casing, and the solution split by the water curtain casing is configured to flush the viscous substance adhered to the water curtain casing.

8. The water storage device of claim 7, wherein a second gap is formed between the water curtain casing and the floating device in a direction perpendicular to a side wall of the water curtain casing, and a width of the second gap ranges from 0.5 mm to 1.5 mm.

9. The water storage device of claim 7, wherein the water curtain casing comprises a fixed casing and a surrounding casing, the fixed casing is configured to be fixed on the guide rod, the surrounding casing surrounds the fixed casing, a first gap is formed between the fixed casing and the surrounding casing, and the solution flows out through the first gap and flushes the viscous substance adhered to the water curtain casing, and wherein the guide rod is fixed in the fixed casing, and the water curtain casing is detachable relative to the guide rod.

10. The water storage device of claim 9, wherein a width of the first gap in a direction perpendicular to a side wall of the water curtain casing ranges from 2 mm to 4 mm.

11. The water storage device of claim 10, wherein a cross-sectional area of the floating device in a direction perpendicular to an extension direction of the guide rod is comprised between 900 $mm^2$ and 1000 $mm^2$.

12. The water storage device of claim 11, wherein a weight of the floating device ranges from 20 g to 30 g.

13. The water storage device of claim 1, wherein the water storage cavity comprises a water outlet, and a first chamber and a second chamber communicated with each other, the guide rod is arranged in the first chamber, the water outlet is communicated with the second chamber, the water inlet is configured to feed the solution containing the viscous substance into the first chamber, and the water outlet is configured to discharge the solution, and wherein the water storage cavity further comprises an isolation plate and a filter screen, the isolation plate isolates the first chamber from the second chamber, and the filter screen is configured to filter the viscous substance.

14. The water storage device of claim 13, wherein the water storage cavity comprises a communication port for communicating the first chamber with the second chamber, and the communication port is arranged at a bottom portion of the water storage cavity.

15. An exhaust gas treatment system, comprising:
at least one water storage device; and
an exhaust gas reaction chamber, wherein the exhaust gas reaction chamber is communicated with the water storage device, the water storage device is configured to store a solution for flushing a processing by-product in the exhaust gas reaction chamber, and the solution is recyclable,
wherein the water storage device comprises:
a water storage cavity and a water inlet, wherein the water inlet is configured to feed the solution into the water storage cavity, the water storage cavity is configured to store or discharge the solution, and the water storage cavity contains a viscous substance;
a guide rod and a floating device movable along the guide rod, wherein the floating device is movable as a water level in the water storage cavity changes, and the viscous substance between the guide rod and the floating device restrains movement of the floating device; and
a water curtain casing, wherein the water curtain casing is communicated with the water inlet, the water curtain casing is configured to split a part of the solution from the solution fed from the water inlet, and the solution split by the water curtain casing is configured to flush the viscous substance between the guide rod and the floating device.

* * * * *